United States Patent
May et al.

(10) Patent No.: US 11,733,182 B2
(45) Date of Patent: Aug. 22, 2023

(54) RADIOGRAPHIC INSPECTION SYSTEM FOR PIPES AND OTHER STRUCTURES USING RADIOISOTOPES

(71) Applicant: Varex Imaging Corporation, Salt Lake City, UT (US)

(72) Inventors: Clyde May, Pensacola, FL (US); David T Nisius, Des Plaines, IL (US); Rajashekar Venkatachalam, Cypress, TX (US)

(73) Assignee: Varex Imaging Corporation, Salt Lake City, UT (US)

( * ) Notice: Subject to any disclaimer, the term of this patent is extended or adjusted under 35 U.S.C. 154(b) by 0 days.

(21) Appl. No.: 16/852,279

(22) Filed: Apr. 17, 2020

(65) Prior Publication Data

US 2021/0190705 A1  Jun. 24, 2021

Related U.S. Application Data

(60) Provisional application No. 62/952,057, filed on Dec. 20, 2019.

(51) Int. Cl.
| | |
|---|---|
| *G01N 23/18* | (2018.01) |
| *G01N 23/04* | (2018.01) |
| *G01N 23/083* | (2018.01) |

(52) U.S. Cl.
CPC .............. *G01N 23/18* (2013.01); *G01N 23/04* (2013.01); *G01N 23/083* (2013.01);
(Continued)

(58) Field of Classification Search
CPC ....... G01N 2223/202; G01N 2223/628; G01N 2223/629; G01N 2223/646; G01N 23/04; G01N 23/083; G01N 23/18
See application file for complete search history.

(56) References Cited

U.S. PATENT DOCUMENTS

| | | | | |
|---|---|---|---|---|
| 2,645,720 A | * | 7/1953 | Gross .................. | G01N 23/205 378/75 |
| 2,719,926 A | * | 10/1955 | Procter ................. | G21F 5/02 976/DIG. 353 |

(Continued)

FOREIGN PATENT DOCUMENTS

| | | |
|---|---|---|
| DE | 3818542 | 12/1989 |
| EP | 3764089 | 1/2021 |

(Continued)

OTHER PUBLICATIONS

"Logic" at https://www.dictionary.com/browse/logic (attached as Exhibit A), last visited on Nov. 8, 2021.

(Continued)

*Primary Examiner* — Dani Fox
*Assistant Examiner* — Soorena Kefayati
(74) *Attorney, Agent, or Firm* — Laurence & Phillips IP Law

(57) ABSTRACT

Some embodiments include a radiographic inspection system, comprising: a detector; a support configured to attach the detector to a structure such that the detector is movable around the structure; a radioisotope collimator; and a collimator support arm coupling the detector to the radioisotope collimator such that the radioisotope collimator moves with the detector.

20 Claims, 9 Drawing Sheets

(52) U.S. Cl.
CPC . *G01N 2223/628* (2013.01); *G01N 2223/629* (2013.01); *G01N 2223/646* (2013.01)

(56) References Cited

U.S. PATENT DOCUMENTS

| | | | | |
|---|---|---|---|---|
| 3,124,689 | A * | 3/1964 | Shure | G03B 15/00 250/497.1 |
| 3,214,586 | A * | 10/1965 | Graham | G01N 23/04 378/197 |
| 3,396,272 | A * | 8/1968 | Olson | G01N 23/083 378/53 |
| 3,721,825 | A * | 3/1973 | Rasmussen, Jr. | G01N 23/22 250/328 |
| 4,056,349 | A * | 11/1977 | Parisis | G01N 23/10 432/32 |
| 4,283,629 | A * | 8/1981 | Habermehl | G01N 23/083 378/197 |
| 4,388,530 | A * | 6/1983 | Lubecki | G01N 23/223 378/45 |
| 4,490,832 | A * | 12/1984 | Ab | G01N 23/2209 378/45 |
| 4,694,479 | A | 9/1987 | Bacskai et al. | |
| 4,698,832 | A * | 10/1987 | Kuusi | G01N 23/083 378/53 |
| 4,785,175 | A * | 11/1988 | Wormaid | G01N 23/222 250/358.1 |
| 5,524,038 | A * | 6/1996 | Fong | G01N 23/046 378/58 |
| 6,324,249 | B1 | 11/2001 | Fazzio | |
| 7,656,997 | B1 | 2/2010 | Anjelly | |
| 9,217,720 | B2 | 12/2015 | Prentice et al. | |
| 10,470,723 | B2 * | 11/2019 | Herrmann | H01L 27/14676 |
| 10,641,693 | B2 * | 5/2020 | Dingman | B63G 8/001 |
| 2003/0058991 | A1 * | 3/2003 | Lott | G01N 23/04 378/60 |
| 2004/0258198 | A1 * | 12/2004 | Carver | G01V 5/0041 378/57 |
| 2006/0078091 | A1 * | 4/2006 | Lasiuk | G01N 23/04 378/198 |
| 2006/0193433 | A1 * | 8/2006 | Ledoux | G01N 23/223 378/57 |
| 2007/0116177 | A1 * | 5/2007 | Chen | A61B 6/027 378/57 |
| 2007/0195926 | A1 * | 8/2007 | Munker | G01N 23/046 378/19 |
| 2008/0056443 | A1 * | 3/2008 | Hu | G01N 23/10 378/57 |
| 2008/0267345 | A1 * | 10/2008 | Nagumo | G01N 23/046 378/11 |
| 2008/0283761 | A1 * | 11/2008 | Robinson | G01N 23/2076 250/370.09 |
| 2012/0039439 | A1 * | 2/2012 | Kia | A61B 6/5205 378/62 |
| 2013/0028377 | A1 * | 1/2013 | Kovarik | B66F 11/042 378/59 |
| 2016/0084967 | A1 * | 3/2016 | Nygard | G01N 23/083 378/62 |
| 2016/0170075 | A1 * | 6/2016 | Schafer | G01V 5/0066 378/57 |
| 2016/0313263 | A1 * | 10/2016 | Featonby | G01N 23/046 |
| 2016/0320282 | A1 * | 11/2016 | Dingman | G05D 1/0088 |
| 2016/0370303 | A1 * | 12/2016 | Schmitz | G01N 23/083 |
| 2017/0038316 | A1 * | 2/2017 | Belcher | G01T 3/00 |
| 2017/0082556 | A1 * | 3/2017 | Bueno | G01N 23/083 |
| 2017/0284947 | A1 * | 10/2017 | Hutchinson | G01N 23/04 |
| 2017/0316916 | A1 * | 11/2017 | Stevens | H01J 37/222 |
| 2018/0100816 | A1 * | 4/2018 | Featonby | G01N 23/18 |
| 2018/0182085 | A1 * | 6/2018 | Zhao | G06T 7/001 |
| 2018/0277272 | A1 * | 9/2018 | Park | G21F 3/00 |
| 2019/0186658 | A1 * | 6/2019 | Rettew | B29C 66/1224 |
| 2020/0264114 | A1 * | 8/2020 | Zhu | G01N 33/2823 |

FOREIGN PATENT DOCUMENTS

| | | |
|---|---|---|
| JP | 2009276285 | 11/2009 |
| JP | 2018-527966 | 9/2018 |
| KR | 100975417 | 8/2010 |
| WO | 02/082125 | 10/2002 |
| WO | 2011/023960 | 3/2011 |

OTHER PUBLICATIONS

"Logic circuit" at https://www.dictionary.com/browse/logic-circuit (attached as Exhibit B), last visited on Nov. 8, 2021.
Korean Application No. 2020-0178076, Amendment dated Jun. 16, 2022.
Korean Application No. 2020-0178076, Amendment dated Jun. 16, 2022 (translation).
Korean Application No. 2020-0178076, Written Opinion dated Jun. 16, 2022.
Korean Application No. 2020-0178076, Written Opinion dated Jun. 16, 2022 (translation).
Korean Application No. 2020-0178076, Rejection dated Apr. 18, 2022.
PCT/IB2020/056415, International Publication No. 2021/005523 as published on Jan. 14, 2021.
PCT/IB2020/056415, Search Report of dated Aug. 20, 2020.
PCT/IB2020/056415, Written Opinion of dated Aug. 20, 2020.
Redmer B. et al. Mechanised Weld Inspection by Tomographic Computer Aided Radiometry (TomoCAR), NDT.net, Dec. 2002, vol. 7, No. 12 [online], [retreived on Jan. 9, 2022]. Retrieved from https://www.ndt.net/article/ecndt02/308/308.htm.
EP19185750.7, Search Opinion dated Jan. 8, 2020.
EP19185750.7, Search Report dated Jan. 8, 2020.
EP19185750.7, Response and Amendments dated Jul. 8, 2021.
EP19185750.7, Communication dated Apr. 7, 2022.
EP19185750.7, Response and Amendments dated Oct. 17, 2022.
Korean Application No. 2020-0178076, Notice of Final Rejection dated Oct. 26, 2022 (with translation).
Korean Application No. 2020-0178076, Written Opinion dated Jan. 27, 2023 (with translation).
Korean Application No. 2020-0178076, Written Decision dated Feb. 16, 2023 (with translation).
Korean Application No. 2020-0178076 published as KR102511383 on Mar. 16, 2023 (with translated claims).

* cited by examiner

RADIOGRAPHIC INSPECTION SYSTEM FOR PIPES AND OTHER STRUCTURES USING RADIOISOTOPES

Radiographic inspection systems may generate images of objects such as pipes and pipe welds. For example, a radiographic inspection system may be attached to a pipe to generate multiple images of a weld. A radioisotope may be exposed, and image may be captured, the radioisotope may be retracted, and a technician may move the radiographic inspection system to another position. The process may repeat until a desired number of images are generated.

DETAILED DESCRIPTION

Figure 1A:
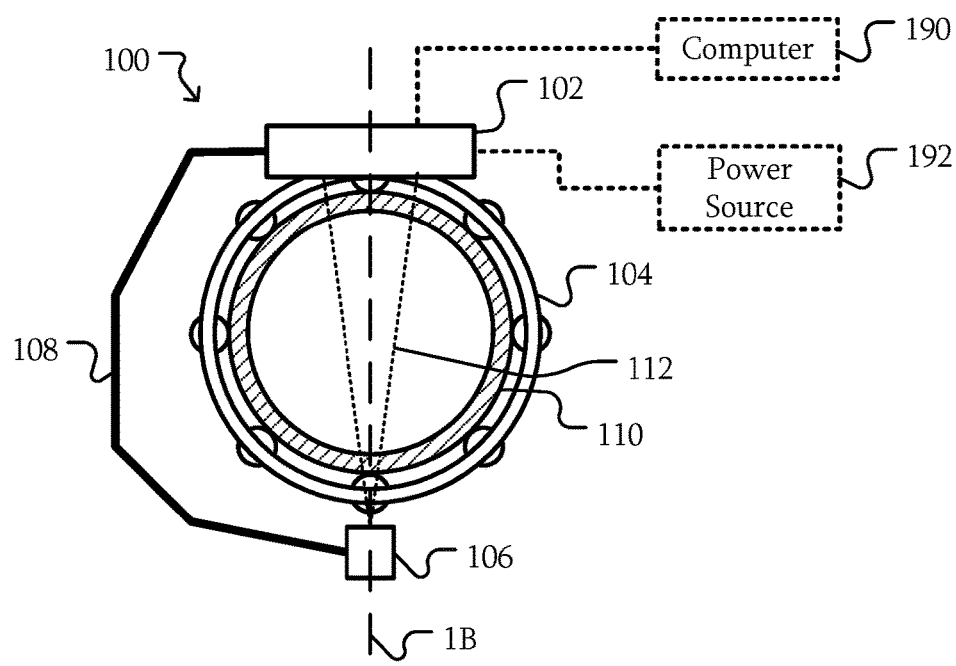
FIG. 1A-1B are block diagrams of radiographic inspection systems using radioisotopes according to some embodiments.

Some embodiments relate to radiographic inspection systems and, in particular, to radiographic inspection systems for pipes and other structures using radioisotopes.

Pipe welds for a variety of different pipe diameters may be inspected using radiographic testing (RT). Examples of such pipe include about 1.5 inch (in.) to about 12 inch (about 3.81 to 30.5 centimeters (cm)) diameter pipe. The pipe may be initially welded during the construction of a facility such as a refinery or chemical plant. The welds may be inspected after the initial welding and/or at periodic inspection intervals, such as when the pipes are inspected for corrosion as may be required by a regulatory or quality assurance requirements. Conventionally, some RT methods use a radioisotope such as Ir-192 as a radiographic source and film to perform a Double Wall Single Image (DWSI) process where the radioisotope source is on one side of the pipe and the film is on the other. Double wall refers to the radiation from the radiographic source penetrating two walls of the pipe (e.g., the pipe wall closest to the radiographic source and the pipe wall closest to the film) before an image is acquired. The portion of the weld being inspected is the side closest to the film. The time for this type of imaging includes the technician placing the source collimator and film around the pipe, retreating to a safe distance to minimize radiation exposure before exposing the source, exposing the pipe for the correct time based on the pipe diameter and wall thickness, retracting the source, retrieving the exposed film for developing, and then moving the source and detector to achieve additional DWSI images of the weld for total coverage. The process may take 3 to 6 film shots to get full coverage and about 15 to 20 minutes of time. As a result, images for about 3-4 complete welds per hour can be completed. In addition, each film must then be reviewed on site and stored in a film repository or converted to digital format for digital storage. Some processes use a flexible phosphor imaging plate that is exposed. The exposed plate is scanned and digitized.

These techniques may be labor intensive and can limit throughput that is especially crucial during facility construction. Other systems designed for weld inspection may include x-ray tubes for DWSI as well as Single Wall Single Image (SWSI). SWSI is a technique whereby the radiographic source is placed inside the pipe by some suitable mechanism and the film wrapped around the outside of the pipe (or a portion of the pipe) and the radiation from the radiographic source on penetrate one wall of the pipe to acquire the image. SWSI with film wrapped around the entire outside of the pipe may be known as a panoramic exposure or imaging. However, a system that includes an x-ray tube will be a larger system to accommodate both the power and the weight, which may limit the applicability to large diameter pipes. The radioisotope source can be a much lighter than an x-ray tube generating similar x-ray or gamma ray energy. In addition, moving such a system to another weld location may require lifting equipment, such as a crane, with larger setup times.

Figure 1B:
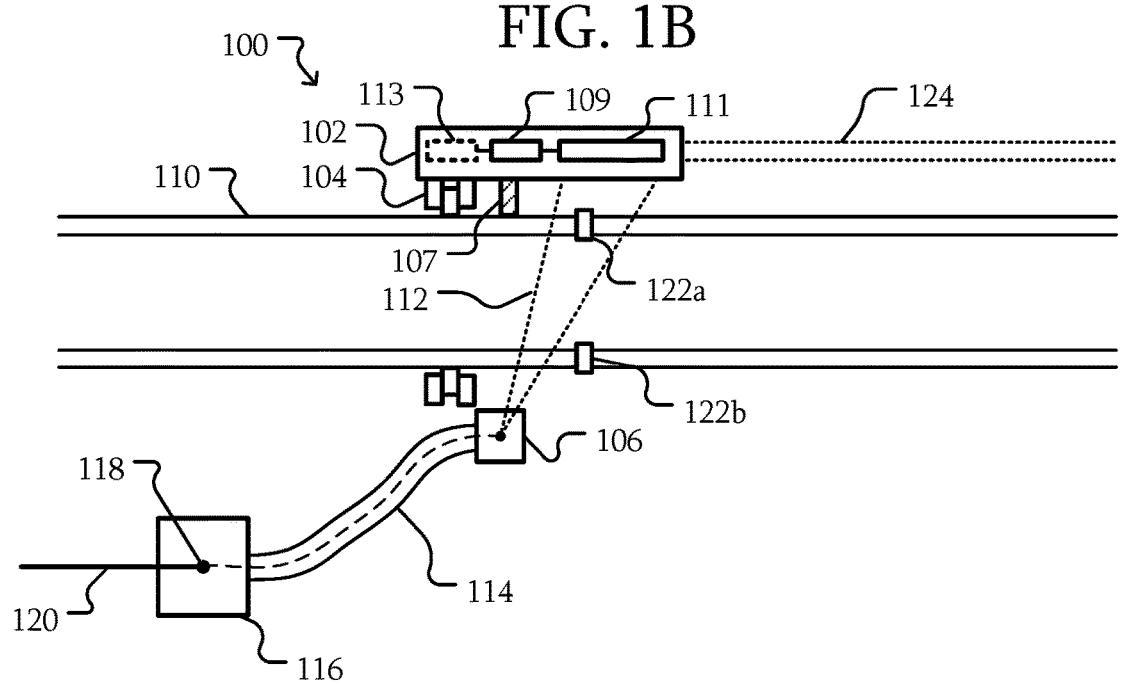

FIG. 1A-1B are block diagrams of radiographic inspection systems using radioisotopes as the radiographic source according to some embodiments. FIG. 1A is a cutaway view and FIG. 1B is a cross-sectional view along plane 1B. Referring to FIGS. 1A and 1B, in some embodiments, the radiographic inspection system 100 includes a detector 102, a support 104, a radioisotope collimator 106, and a collimator support arm (CSA) 108. A radioisotope 118, exposure device 116, exposure tube 114, or the like may be part of and/or used with the system 100 to generate images based on the pipe 110 or other objects.

The detector 102 includes a two-dimensional imaging array 111 of sensors configured to sense the radiation 112 from a radioisotope 118 when disposed in the radioisotope collimator 106. The detector 102 may include an amorphous silicon (a-Si), indium gallium zinc oxide (IGZO), or complementary metal-oxide-semiconductor (CMOS) flat panel detector, or the like. In other embodiments, the detector 102 may include a curved detector. In other embodiments, the detector 102 may include a flexible detector 102 that may be conformable to the curvature of the pipe 110. In some embodiments, the curvature of the flexible detector 102 may be different than that of the pipe 110 to accommodate the detector 102 being radially offset from the pipe 110. In other embodiments, the detector 102 may include a line scanner with a small number of pixels along the width relative to number of pixel along the length. Line scanners work well in continuous scanning applications or applications of continuous uniform movement of the detector 102.

A conversion screen, scintillator, or the like may be included in the detector 102 to convert the radiation 112 into wavelengths detectable by the imaging array 111 of the detector 102. For example, a scintillator may include gadolinium oxysulfide ($Gd_2O_2S$; GOS; Gadox), gadolinium oxysulfide doped with terbium ($Gd_2O_2S$:Tb), cesium iodide (CsI), or the like. Although some materials of the scintillator have been used as examples, in other embodiments, the material may be different depending on the particular radioisotope 118. In other embodiments, the imaging array 111 may include direct conversion sensors, including cadmium telluride (CdTe), cadmium zinc telluride (CdZnTe or CZT), selenium, or the like, configured to directly convert the radiation 112 into a signal.

In some embodiments, a pixel area of the imaging array 111 of the detector 102 may be about 14.6×14.6 cm (or 5.8×5.8 in). The imaging array 111 may include a 1152× 1152 array of pixels. The pixel pitch may be about 127 microns (μm). The detector 102 may be configured to digitize outputs of the pixels with at least 16-bit precision. The detector 102 may include communication interfaces such as a universal serial bus (USB) interface, Ethernet interface, or the like. Although particular components and parameters of the detector 102, imaging array 111, or the like have been used as examples, in other embodiments, the parameters may be different.

The detector 102 may include control logic 109. The control logic 109 may include a general purpose processor, a digital signal processor (DSP), an application specific integrated circuit, a microcontroller, a programmable logic device, discrete circuits, a combination of such devices, or the like. The control logic 109 may include external interfaces, such as address and data bus interfaces, interrupt interfaces, or the like. The control logic 109 may include other interface devices, such as logic chipsets, hubs, memory controllers, communication interfaces, or the like to connect the control logic 109 to internal and external components. The control logic 109 may be configured to control the variety of operations described herein.

The system 100 may be configured to operate with pipe 110 having a diameter from about 2 in. to about 12 in. (about 5 cm to 30.5 cm). In some embodiments, the range of pipe 110 diameter may be different. In some embodiments, the system 100 may be configured for a single pipe 110 diameter. In other embodiments, the system 100 may be adjustable so that the system 100 may be used with pipes 110 of a range of diameters. The pipe 110 may be ferrous or non-ferrous. In some embodiments, the use of an x-ray source may have difficulty due to refraction from alloy elements in some pipe. The use of a radioisotope 118 may reduce an effect of such alloys.

In some embodiments, the system 100 may weigh less than about 30 pounds (lbs.; about 13.6 kilograms (kg)), about 55 pounds (about 25 kg), or the like. The weight may be low enough that a single person may attach, operate, and detach the system 100 from the pipe 110. For example, the detector 102 may weight about 6 lbs. or 2.7 kg. Motors, chains, structural components, or the like may be selected to keep the weight under the limits described above.

The support 104 is configured to attach the detector 102 to a structure such that the detector 102 is movable around the structure. Here, a pipe 110 is used as an example of the structure, but in other examples another structure may be used. In some embodiments, the support 104 is configured to rotatably couple the detector 102 to the pipe 110. For example, the support 104 may include a chain belt, roller chain, a flexible structure, or the like wrapped around the pipe 110. In a particular example, the chain belt may rotatably couple the detector 102 to the pipe 110 while a motor, wheels, or other structures maintain and/or rotates the position of the detector 102 around the pipe 110. Here, a wheel 107 that contacts the pipe 110 may rotate the detector 104 about the pipe and/or hold the detector 102 in a particular position. In some embodiments, the support 104 rotates with the detector 102; however, in other embodiments, the support 104 may be a structure attachable to the pipe 110 and the detector 102 may rotate about the support 104 and consequently rotate about the pipe 110. In some embodiments, the detector 102 and/or the support 104 may be configurable to place the detector 102 at a desired distance from the weld and/or the pipe 110 surface. For example, the support 104 may be configurable to place the detector 102 with a clearance of 0.35 in. (or 8.9 millimeters (mm)), clearance of 0.5 in. (or 1.27 cm), clearance of 1 in. (or 2.54 cm), relative to the weld 122 or pipe 110 wall.

In some embodiments, the support 104 may have an adjustable length. For example, a chain belt may have a sufficient length to encircle pipes 110 with a range of diameters, such as from about 1.5 in. to about 12 in. (or about 3.81 cm to about 30.5 cm).

The radioisotope collimator 106 is a structure configured to shape the radiation 112 from the radioisotope 118. For example, the radiographic collimator 106 may include shielding to block radiation 112 emitted in undesirable directions and a collimating structure such as a series of parallel openings to shape the emitted radiation 112 when the radioisotope 118 is within the radioisotope collimator 106.

The radioisotope collimator 106 may be rigidly and/or adjustably coupled to the detector 102 by the collimator support arm 108. The collimator support arm 108 may provide zero or more degrees of freedom to position the radioisotope collimator 106 relative to the detector 102. For example, the collimator support arm 108 may include a c-shaped arm that rigidly connects the radioisotope collimator 106 to the detector 102. Such a system 100 may be designed for a single diameter of pipe. In other examples, the collimator support arm 108 may include multiple degrees of freedom to rotate and/or translate the radioisotope collimator 106 relative to the detector 102. The collimator support arm 108 may be configurable to be fixed to rigidly (or semi-permanently) connect the radioisotope collimator 106 to the detector 102 after adjustment. Thus, the orientation of the radioisotope collimator 106 and the detector 102 may be fixed during that operation. However, for another operation, such as when the system 100 is moved to a different diameter pipe, the collimator support arm 108 may be adjusted to accommodate the difference in the pipe diameter. In some embodiments, the collimator support arm 108 may include a series of joints to adjust the position and orientation of the radioisotope collimator 106. Regardless, the collimator support arm 108 may be configurable to be fixed after adjustment such that when the detector 102 moves around the pipe 110, the relative position between the detector 102 and the radioisotope collimator 106 remains substantially the same. Substantially the same may include the same position but also includes some variation due to mechanical tolerances, distortion of the collimator support arm 108, or the like.

Radioisotopes 118 may be more extensively used in field radiography than x-ray tubes in particular industries such as the oil and gas industry for reasons such as size, weight, power, cabling, accessibility, and/or energy requirements. With a system 100 described herein, the user may continue to use a radioisotope 118 with the improved performance of the system 100.

The radioisotope 118 may be configured to be disposed in the exposure device 116. The exposure device 116 may include a structure that allows for the radioisotope to be extended and retracted towards the radioisotope collimator 106. For example, the radioisotope 118 may be coupled to a cable 120. The cable 120 may be manipulated, such as by turning a crank, activating a motor, or the like, to move the radioisotope 118 through the exposure tube 114 to the radioisotope collimator 106. The radioisotope 118 is illustrated in the retracted position in solid lines and in the exposed position in dashed lines.

When exposed, the radiation 112 travels through both walls of the pipe 110, but only the portion 122a of the weld 122 on the wall closest to the detector 102 sufficiently sharp for inspection. That is, the portion 122b of the weld 122 may be in a position that does not result in a noticeable detected signal at the imaging array 111 and/or may be in a position where an intensity of the radiation 112 is reduced relative to the portion 122a due to the radioisotope collimator 106. The radioisotope collimator 106 may be axially offset along the pipe 110 from the detector 102. In an example, the axial offset may avoid the imaged radiation 112 penetrating at least the portion 122b of the weld 122 on the wall furthest to the detector 102 (the wall closest to the radioisotope collimator 106). The collimator support arm 108 may be configurable to place the radioisotope 118 in such a position for a variety of diameters of pipe. With the radioisotope 118 in place, the system 100 may rotate 360 degrees around the pipe 110 to inspect 100% of the weld.

In some weld imaging applications, a detector and an x-ray source may not be practical on pipes with diameters less than about 15 in. An x-ray source with sufficient energy may be too large to be placed around a relatively smaller pipe. An x-ray source that is small enough may not generate radiation with a sufficient energy to penetrate the pipe. That is, the radiation needs a sufficient energy to penetrate the pipe, depending on its size or the pipe schedule. An example of such an energy is 250 kilovolts (kV) or more. A radioisotope may provide radiation with this energy and still be relatively portable.

Some embodiments include a human portable inspection system that can be attached and removed easily. In particular, the human portable inspection system may be attached and removed by a single person. A human portable inspection system may include a system that weighs less than about 20 pounds (about 9.1 kg), less than about 25 pounds (about 11.4 kg), less than about 30 pounds (about 13.6 kg), less than about 45 pounds (about 20.4 kg), or less than about 55 pounds (about 25 kg). The system 100 is an example of such a human portable inspection system.

In some embodiments, the detector 102 is configured to receive power and/or communication through one or more cables 124. In operation, as the system 100 rotates about the pipe 110, the cables 124 may be wound around the pipe 110. Thus, the cables 124 may be flexible enough and long enough to wind around the pipe 100 by at least one complete revolution. In particular, as no human intervention may be permitted during the operation as the radioisotope 118 may be continuously exposed, which generates high doses of radiation.

In some embodiments, the detector 102 may be configured to communicate wirelessly without using the cables 124. For example, the detector 102 may include wireless communication systems 113 for operation with Wi-Fi, Bluetooth, cellular data networks, satellite communication networks, or the like. In some embodiments, the control logic 109 may be configured to communicate the images through the wireless communication system 113. In other embodiments, the detector 102 may be configured to communicate through the cable 124 to a wireless communication system. Accordingly, data generated by the system 100 may be transmitted as desired to a variety of destinations and/or the control of the system 100 may be performed remotely.

As will be described herein, once the system 100 is secured to the pipe 110, the radioisotope 118 is exposed. While the radioisotope 118 is exposed, the system 100 is rotated 360 degrees around the pipe 110 and the resulting digital images can be stitched together to present one image of the weld for evaluation. This composite image can be inspected on site or can be transmitted via network or satellite communication for evaluation by an offsite expert. The image along with any other metadata collected can then also be digitally stored.

In some embodiments, the imaging array 111 of the detector 102 may have an active area of a particular size. The control logic 109 may be configured to select an active area of the imaging array 111 that is smaller than the entire active area for the acquisition of images. In particular, the system 100 may be used with a variety of different objects such as a variety of different diameters of pipe 110. For a smaller diameter of pipe 110, a smaller active area may be used while a larger active area is used with a larger diameter of pipe 110. The active area may not put an upper limit on the diameter of pipe 110. Even if the entire active are is used, a smaller rotational step may be used during the acquisition of images to generate a composite image of a weld 122.

In some embodiments, the detector 102 may have shielding for components that are separate from the imaging array 111. For example, the energy range of the radiation 112 may be from about 280 kV to about 720 kV. The radiation 112 may have a variety of discrete energy peaks. The shielding may reduce the amount of radiation that reaches the control logic 109 or other components of the detector 102, reduce one or more of the peaks, or the like.

FIG. 2A-2E are block diagrams of an operation of a radiographic inspection system according to some embodiments. Referring to FIG. 2A, a pipe 110 will again be used as an example of an object to be imaged; however, the system 100 may be used to image different objects. The system 100 may be installed on the pipe 110. For example, the support 104 may be attached at one end to the detector 102. The support 104 may be wrapped around the pipe 110 and attached again to the detector.

Adjustments may be made to secure the system 100. For example, the support 104 may be adjusted to secure the detector 102 to the pipe 110. A position of the detector 102 relative to the pipe 110, such as a height, an orientation, or the like may be adjusted.

In some embodiments, the position of the radiographic collimator 106 may be fixed relative to the detector 102 and thus, its position may not be adjusted; however, in other embodiments, the position may be adjustable. As described above, the collimator support arm 108 may include multiple degrees of freedom that may be adjusted to align the radiographic collimator 106 such that the expected radiation 112 (as illustrated in FIG. 1A) may be incident on the imaging array 111 (as illustrated in FIG. 1A).

Figure 2A:
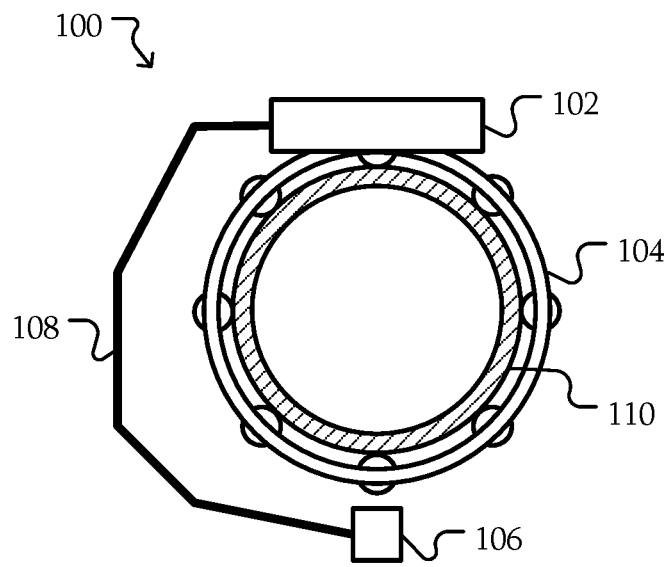
FIG. 2A-2E are block diagrams of an operation of a radiographic inspection system according to some embodiments.
Figure 2B:
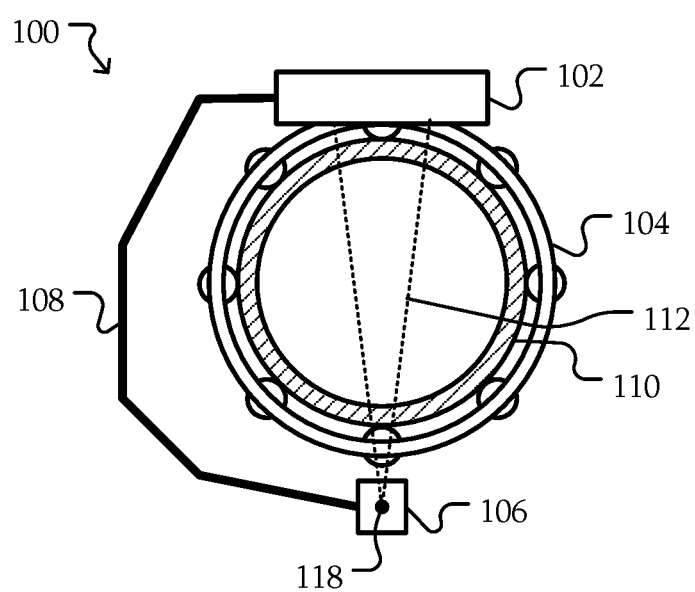

Referring to FIG. 2B, the radioisotope 118 may be extended to the radiographic collimator 106. As a result, radiation 112 may pass through the pipe 110, a weld 122 (as illustrated in FIG. 1B), and be detected by the imaging array 111 of the detector 102. An image of the weld 122 may be generated at this rotational position around the pipe 110.

Figure 2C:
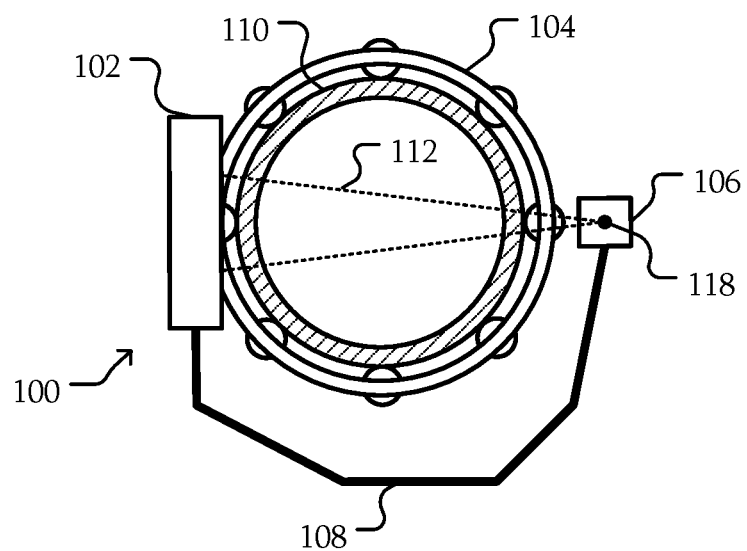
Figure 2D:
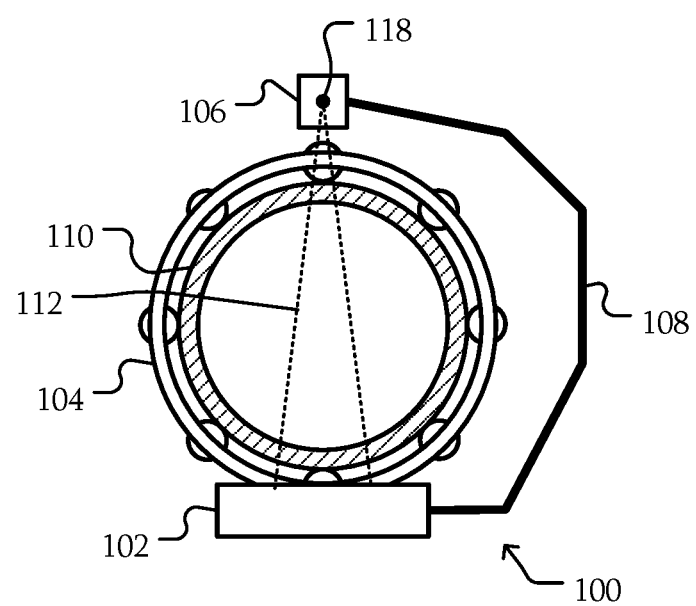
Figure 2E:
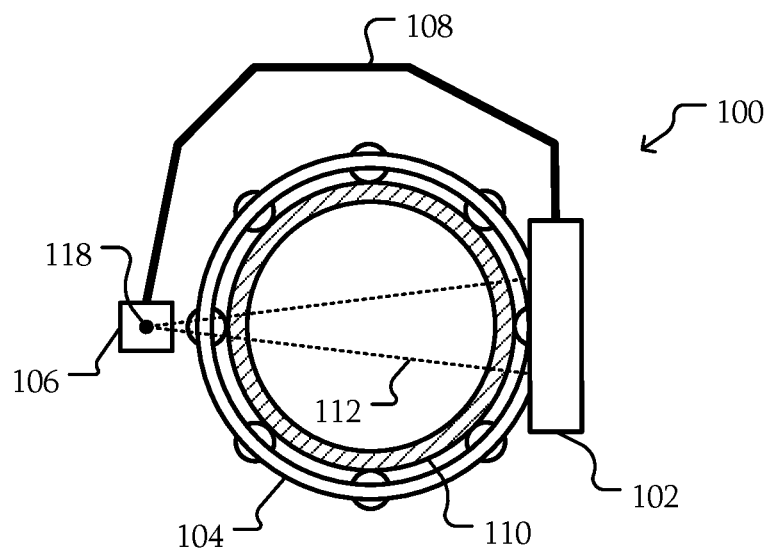

Referring to FIG. 2C-2E, the system 100 may be rotated about the pipe 110. Here, a 90 degree rotation is illustrated from figure to figure; however, in other embodiments, the angular change may be different, including smaller or larger. In particular, while the radioisotope 118 is generating the radiation 112 in the radioisotope collimator 106, the detector 102 may be moved from position to position. At each position, an image is acquired. For example, a total of 10 images may be acquired, each equally spaced around the pipe 110. Once a first image is acquired, the detector 102 may be rotated 36 degrees. Another image may be acquired at the new position. The rotation and acquisition may be repeated until images at each desired location are acquired. In some embodiments, an image may be acquired at the end in the position where the imaging started in FIG. 2B. Once the last image is acquired, the radioisotope 118 may be retracted into the exposure device 116.

In some embodiments, the radioisotope 118 may be exposed and retracted only once during a scan of the entire weld 122. However, in other embodiments, the radioisotope 118 may be exposed and retracted more than once per weld 122, but less than once per image. For example, the radioisotope 118 may be exposed, one half of the images are acquired, and the radioisotope 118 is retracted. The process may be repeated to generate images at all desired positions along the weld 122. As the process may be performed for less than once per acquired image, the overhead of exposing and retracting the radioisotope 118 may be reduced.

In some embodiments, a check procedure may be performed. The check procedure may include acquiring a single image. The single image may be used to verify an acceptable Image Quality Indicator (IQI) detection, acceptable alignment, the visibility of lead indicators/numbers, or the like. In some embodiments, the IQI may include wires, a plaque with predrilled holes, or the like. The IQI may be placed near lead numbers placed around the pipe. The system 100 may be moved, the radiographic collimator 106 may be adjusted, or the like to adjust the relative positions until an acceptable image is acquired.

In some embodiments, a test scan may be performed without the radioisotope 118 being exposed. For example, the detector 102 may be fully rotated around the pipe 110. In some embodiments, the detector 102 rotation may be stopped at each point where an image would be acquired in an actual scan. In some embodiments, the detector 102 may be rotated in a reverse direction to return the detector 102 to its initial state after the test scan is performed.

In some embodiments, an operational method may include acquiring data at a number of discrete locations with sufficient overlap such that magnification differences are minimized. As a result, stitching of the images to form a composite image may include translation and rotation to match the images rather than scaling, non-linear distortion, or the like.

In some embodiments, dwell time at a given location may be set to achieve a required contrast to noise ratio (CNR) via IQI detection. The dwell time may be determined through test images captured in a single rotational position. The dwell time may be manually or automatically adjusted to achieve the desired contrast in an image.

In some embodiments, the number of dwell points may be set by the circumference of the circle formed by the radiographic collimator 106 to the detector 102 divided by the useful active area to achieve the stitching or combining into a composite image described herein.

In some embodiments, another operational method may include acquiring data continuously as the system 100 rotates. For example, a single row of pixels of the imaging array 111 may be used to acquire one dimensional images as the system 100 rotates. In another example, the entire imaging array 111 may be used to sample the same point on the pipe via multiple detector pixels. The speed may be set to achieve the CNR as determined by the IQI's. The detector 102 data may be re-sampled into an arc of a circle to alleviate magnification differences from the different detector pixel locations.

In some embodiments, a scan time may be calculated based on isotope strength, pipe 110 diameter and wall thickness, and a stitching algorithm based on a defined active area of the panel and the pipe diameter. The scan time may be calculated based the dwell time, integration time, the number of frames to average, or the like. In addition, the dwell time may be based on achieving a particular image quality level, such as an ability to see a given wire of an IQI in the image. For example, when imaging a schedule 40 6 in. pipe with a 50 Curie radioisotope 118, a desired image quality may be achieved with a gray count of 25000 counts with an integration time of 10 seconds. This information may be used to calculate the integration time for other radioisotopes 118. As there is a linear relationship between integration time and gray count for a given Curie strength, the use of radioisotope 118 with a different Curie strength may be converted into a different integration time.

In some embodiments, the operation may include selection of pipe type and strength of the radioisotope 118. The values may then be used to suggest parameters for the image acquisition. Using those parameters or parameters modified by a user, the image acquisition is performed, resulting in multiple images. The multiple images are then stitched and/or combined into a composite image. In some embodiments, the composite image may be annotated. While information may be embedded into the image through the use of lead elements adjacent to the weld, in some embodiments, metadata of the composite image may be annotated with such data and or other data related to the weld 112, the scanning parameters, the pipe 110, the radioisotope 118, or the like. In some embodiments, the image data may be modified to annotate the composite image. For example, a crack, void, flaw, or the like in a pipe/weld may be identified and highlighted in the image data.

Figure 3:
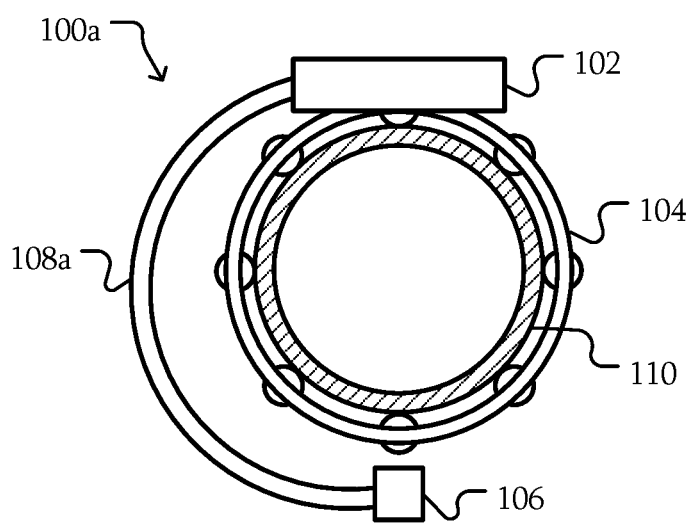
FIG. 3-4B are block diagrams of radiographic inspection systems using radioisotopes according to some embodiments.
Figure 4A:
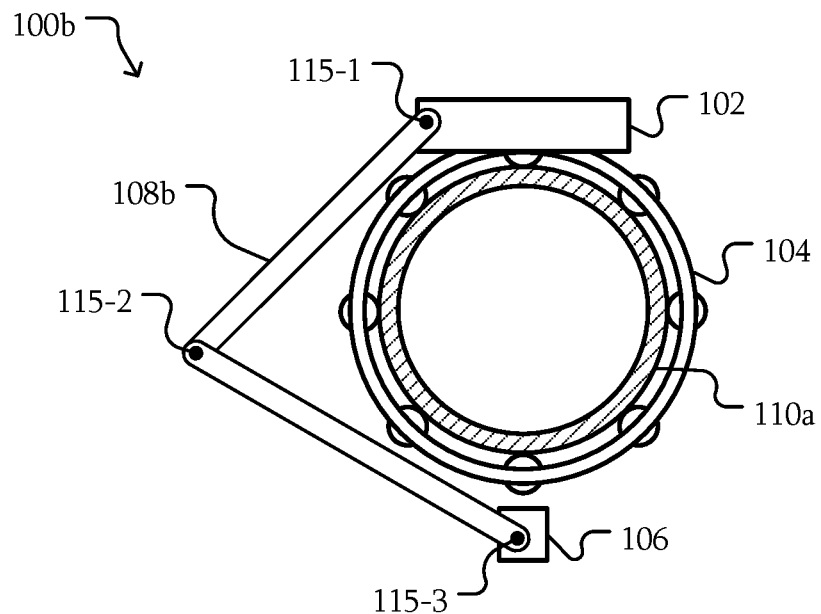
Figure 4B:
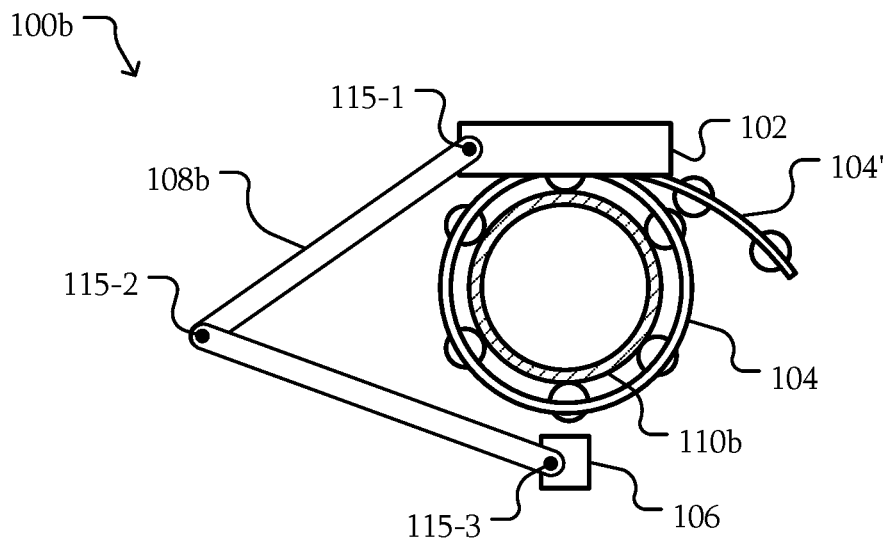

FIG. 3-4B are block diagrams of radiographic inspection systems using radioisotopes according to some embodiments. Referring to FIG. 3, the collimator support arm includes a c-arm 108a. The c-arm 108a may have a shape such that the system 100a may be position around a largest diameter pipe 110 for that system 100a. The system 100a may be used with other, smaller diameters of pipe 110. In some embodiments, the c-arm 108 is fixed to the detector 102 and the radiographic collimator 106. As a result, the alignment of the detector 102 and the radiographic collimator 106 may not need to be adjusted.

Referring to FIGS. 4A and 4B, the system 100b may be similar to the system 100 described above. However, in some embodiments, the collimator support art 108 may be adjustable. Here, a collimator support arm 108b with at least three degrees a freedom is illustrated. That is, the collimator support arm 108b may be adjustable at least by rotating three different joints 115-1, 115-2, and 115-3. Although three joints 115 has been used as an example, in other embodiments, more or less joints may be used. In addition, the joints 115 may include rotating and/or translating mechanisms.

The configuration in FIG. 4A illustrates a configuration where the support 104 is extended to about a maximum. Thus, the diameter of the pipe 110a may be at or near a maximum pipe diameter for the system 100b. In contrast, the same system 100b may be adjusted to fit the smaller diameter pipe 110b illustrated in FIG. 4B. In this example, a roller chain is used as the support 104. A tail or excess of the roller chain 104' may remain after attaching the system 100b to the pipe 110b. In addition, the joints 489115 of the support arm 108b may be adjusted so that the radiographic collimator 106 is disposed in a desired position relative to the pipe 110b and the detector 102.

In some embodiments, one or more of the joints 115 may be electronically controllable. For example, one or more of the joints 115 may include actuators such as motors, solenoids, hydraulic or pneumatic cylinders, or the like configured to actuate the joint. The control logic 115 may be coupled to the actuators and configured to control the actuators to put the radiographic collimator 106 in a desired position. In some embodiments, the actuators may be controllable while the radioisotope 118 is exposed. The position of the radiographic collimator 106 may be changed based on feedback from acquired images to improve image quality, avoid the portion 112b of the weld 112, or the like.

In some embodiments, the control logic 109 may include a memory storing information related to a position of the radiographic collimator 106 based on pipe diameter or other pipe characteristics. In other embodiments, the control logic 109 may be configured to receive such information through the wireless communication system 113 or cable 124 from the computer 190 or other system.

Referring back to FIGS. 1A and 1B, in some embodiments, the system 100 is set-up. Lead markers may be placed close to the weld in a circumferential manner such that the markers appear in the acquired images. The system 100 may be attached to the pipe 110 in a location overlapping the weld 122. The collimator support arm 108 may then be adjusted to position the radioisotope collimator 106 to generate an acceptable image.

The acquisition may be setup by, for example, selecting a type of pipe such as by diameter, schedule, or the like. Particular examples include selecting a 4 in. nominal size, schedule 40 pipe, or the like. A scan plan may be uploaded to the detector 102. The scan plan may include parameters such as the type of pipe, radioisotope 118 strength, the curie strength, number of acquisitions/individual images, integration time, number of frames to average, position of actuators of the collimator support arm, or the like. In some embodiments, the configuration of the pipe may be used to automatically generate a scan plan and the associated parameters.

In some embodiments, an active area of the detector 102 may be changed based on the pipe diameter. For example, for larger pipes 110, a larger area may be used. In some embodiments, the active area may be selected based on the radius of the pipe such that a deviation of the pipe from flat associated with the active area is less than a threshold, such as ¼ in. or a fraction of the separation of the detector 102 and the pipe 110. In other embodiments, other criteria may be used to select the size of the active area. In a particular example, a 3 in. wide active area may be used with a 12 in. diameter pipe. In some embodiments, a larger active area may be used. The image may be post-processed to account for the curvature of the pipe relative to the detector 102, such as a change in the magnification, relative intensity, or the like.

Figure 5A:
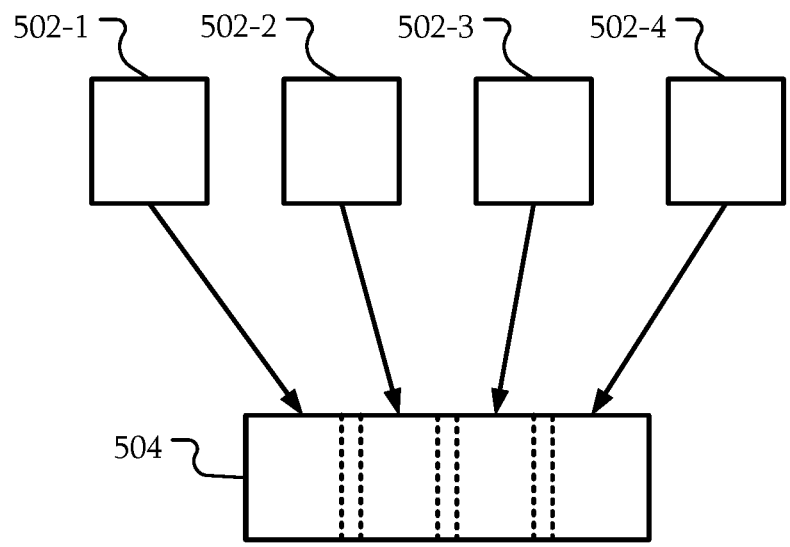
FIGS. 5A and 5B are block diagrams of operations performed on images from a radiographic inspection system according to some other embodiments.
Figure 5B:
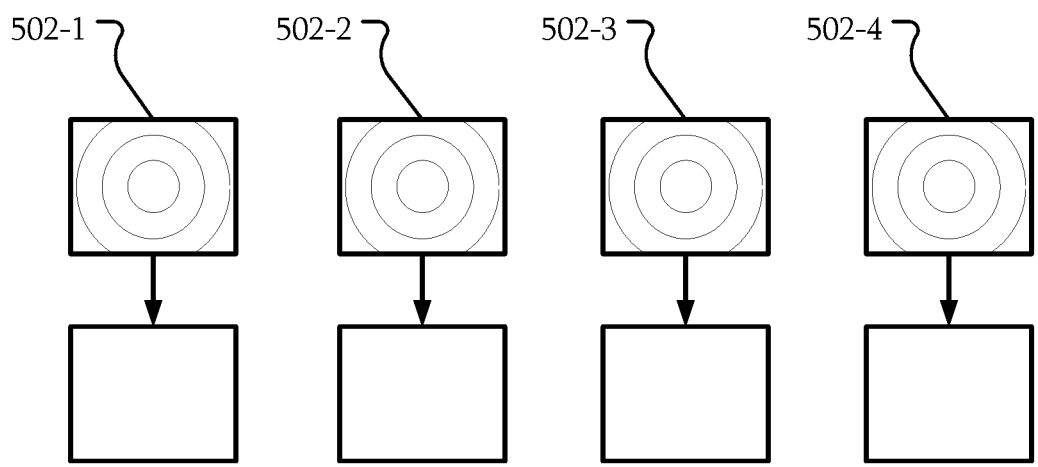

FIGS. 5A and 5B are block diagrams of operations performed on images from a radiographic inspection system according to some other embodiments. Referring to FIG. 5A, multiple images 502 may be acquired at different positions around an object. The images 502 may be combined into a composite image 504. The dashed lines represent the borders of the individual images 502. In the overlapping regions, the images may be combined in a variety of ways. For example, the data may be averaged in the overlapping region, combined using a weighted average depending on proximity to one or the other of the two images, or the like. Although some overlap has been used as an example, in other embodiments, the imaged may be tiled together without overlap.

Referring to FIG. 5B, in some embodiments, the images 502 may be preprocessed before being combined as described above, For example, the curvature of the object, such as the curvature of a pipe wall, the relative intensity of the radiation 118, or the like may be used to scale, distort, or otherwise transform the data of each image 502. In some embodiments, the images may be processed to normalize the images to represent an image taken as if the imaging array 111 followed the contour of the object and a substantially uniform radiation source was used to illuminate the imaging array 111.

In a particular example, the radiation source 118 and the radioisotope collimator 106 produces radiation 112 which may induce a bright center somewhere in the middle of the image. This radiation 112 may have a circular or elliptical shape and decreases in intensity towards the border of the image 502. When stitching two adjacent images together, these images may have an overlapping region with an incline in one image and a decline in the other which may increases a difficulty when applying any cross correlation procedure to obtain the degree of overlap of the two images.

In some embodiments, an operation to subtract the beam profile from each image may be performed. For example, the operation may assume that the intensity of the radiation source drops off exponentially as described in equations 1 and 2.

$$p(x, y) = be^{-ar} \qquad (1)$$

$$r = \sqrt{z^2 + (x - x_{max})^2 + e^2(y - y_{max})^2} \qquad (2)$$

Variables x and y denote the position of each pixel of the image (matrix). In an example, x and y range from 1 to 1152; however, the values may change based on the detector 102 and other processing. The 6 quantities a, b, e, $x_{max}$, $y_{max}$ and z need to be determined for each image taken. $x_{max}$ and $y_{max}$ denote the maximum position of the beam profile on the image coordinate system. z denotes the distance of the source and is orthogonal to the image plane. e stands for the ellipticity of the beam profile. The profile may be assumed to be elongated only in the x- or y-direction. a and b are arbitrary constants which describe the exponential fall off. However, a is usually rather small relative to b with a being about 0.001 and b on the order of about 1. To determine the 6 unknown quantities a nonlinear regression fit may be computed with equation 3.

$$\chi^2(a,b,e,x_{max},y_{max},z) = \Sigma_{i,j}(p_{i,j} - p(x_i,y_j)^2) \qquad (3)$$

Here $p_{i,j}$ is the intensity of each pixel of the image. To find the maximum likelihood parameter estimation of the 6 parameters we may find the minimum of the 2-fit which is given by equations 4-9.

$$\frac{\partial \chi^2}{\partial a} = 0 \qquad (4)$$

$$\frac{\partial \chi^2}{\partial b} = 0 \qquad (5)$$

$$\frac{\partial \chi^2}{\partial c} = 0 \qquad (6)$$

-continued $$\frac{\partial \chi^2}{\partial x_{max}} = 0 \quad (7)$$

$$\frac{\partial \chi^2}{\partial y_{max}} = 0 \quad (8)$$

$$\frac{\partial \chi^2}{\partial z} = 0 \quad (9)$$

Solving this nonlinear set of equations may use the Levenberg-Marquardt method which is a method that may be used for non-linear regression fits. In some embodiments, the exponential law may be cast into a semi-linear problem by applying the logarithm in equations 10 and 11 on equation 1.

$$\ln(p(x)) = -ar + \hat{b} \quad (10)$$

$$\hat{b} = \ln b \quad (11)$$

After determining the 6 parameters the beam profile may be subtracted as in equation 12.

$$p_{no\ profile}(x,y) = e^{\ln p_{i,j} - \ln(p(x,y))} \quad (11)$$

This new obtained image is ready to be applied for combining with other images into a composite image. In some embodiments, the image may be combined by correlating features of the image such as numbers generated by a numbered lead strap around the pipe or other ICIs. As a result, the multiple images may be combined into a single image. The single image may make an evaluation operation easier as only one image would need to be stored retrieved, managed, or the like.

Figure 6:
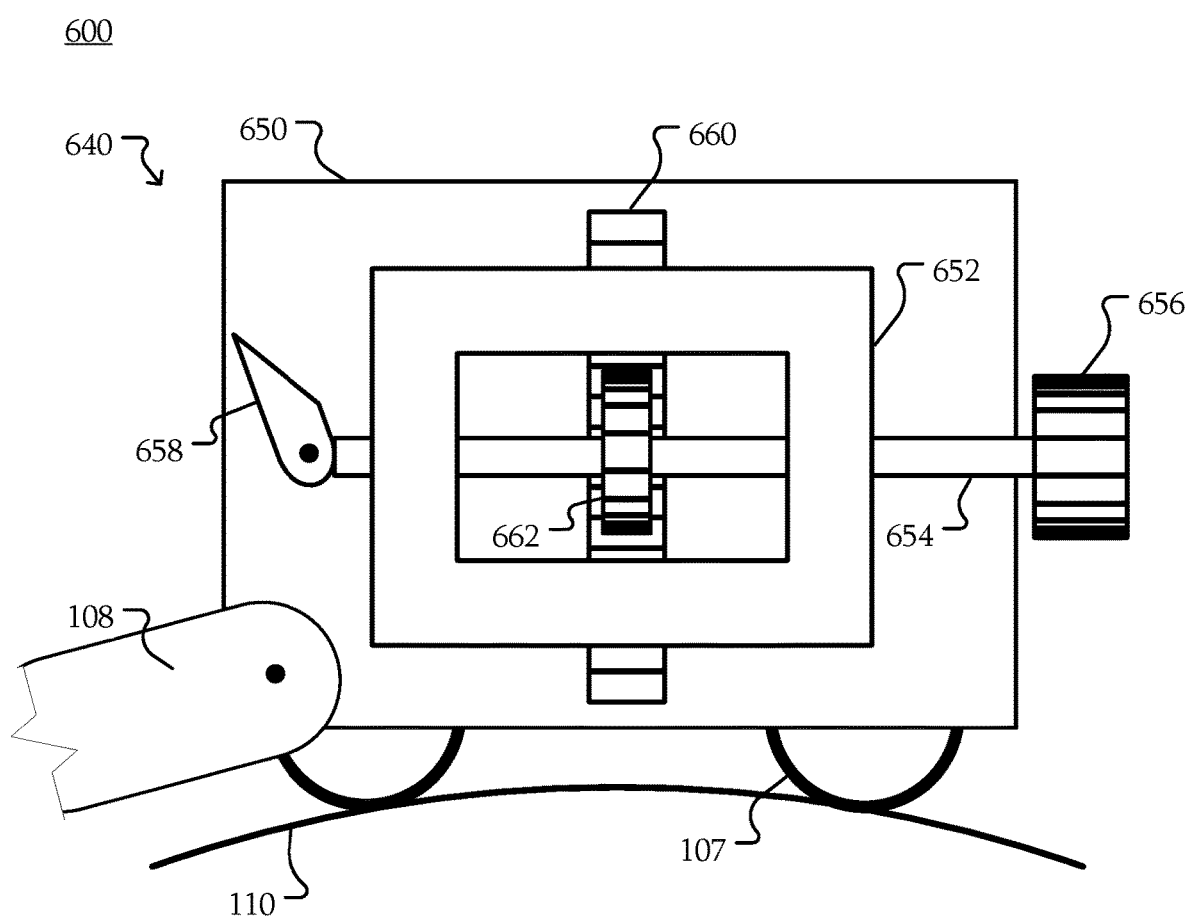
FIG. 6 is a block diagram of a portion of radiographic inspection system according to some embodiments.

FIG. 6 is a block diagram of a portion of radiographic inspection system according to some embodiments. The radiographic inspection system 600 may be similar to the radiographic inspection system 100 or the like described above. Here, the radiographic inspection system 600 includes an elevation adjustment mechanism 640, which may be manually, automatically, or electronically adjusted. The elevation adjustment mechanism 640 includes a first structure 650 and a second structure 652 that are movable relative to each other and may be fixed relative to each other. For example, in some embodiments, the elevation adjustment mechanism 640 may include a linear gear 660 attached to the first structure 650. A gear 662 may be attached to the second structure 652 and disposed to mesh with the linear gear 660. A shaft 654 with an adjustment knob 656 may allow for movement of the first structure 650 relative to the second structure 652. Although an adjustment knob is shown in FIG. 6, in other examples, the elevation of the elevation adjustment mechanism may include actuators such as motors, solenoids, hydraulic or pneumatic cylinders, or the like configured to operate the gears. The control logic 109 may be coupled to the actuators and configured to control the actuators to adjust the elevation adjustment mechanism move the radiographic inspection system to a desired elevation.

When the radiographic inspection system 600 is attached to a pipe 110, the support 104 (not illustrated) may attach the detector 102 including the elevation adjustment mechanism 640 to the pipe 110 such that wheels 107 may move the detector 102 around the pipe 110. The first structure 650 may be rigidly coupled to the wheels 107. As a result, a separation of the first structure 650 to the pipe 110 may remain substantially the same. However, as the second structure is movable relative to the first structure 650, the second structure 652 may be moved relative to the pipe 110. The imaging array 111 of the detector 102 may be attached to the second structure 652 such that its relative distance to the pipe 110 may be adjusted. This may allow for greater precision in positioning the detector for a given pipe 110. A locking system 658 may lock the detector 102 in place after adjustment.

Although particular examples of structures that allow for the adjustment of the relative position of portions of the detector 102 to the pipe 110 or other object have been used as examples, in other embodiments, different structures and/or mechanisms may be used to alter the relative position.

Referring back to FIGS. 1A and 1B, in some embodiments, the system 100 may be configured to receive power from a mains power source, such as a 110/220V power source. For example, the power may be provided through the cable 124. In other embodiments, the system 100 may be configured to receive power from a power source 192 such as a portable power source, a battery, an inverter, or the like. In yet other embodiments, the system 100 may include an internal power source, such as an internal battery.

In some embodiments, the system 100 may include a computer 190 that may communicatively couple to the system 100. Examples of such devices include a tablet, a desktop computer, a workstation, a mobile device, or the like. Such a device may be configured to receive individual images, combine the individual images into a combined image of an entire weld, receive a combined image, transmit the individual and/or combined images, or the like. In some embodiments, the control of operations may be distributed between the computer 190 and the control logic 109.

In some embodiments, remote analysis may be performed. The individual images and/or combined image may be transmitted to a remoted location. An operator at the remote location may evaluate the weld. In addition to or in place of being remotely accessible, interpretation may be performed locally at the computer 190. In other embodiments, multiple sets of images for multiple welds or other structures may be collected and transmitted/evaluated in bulk.

In some embodiments, the computer 190 may provide a graphical user interface (GUI). The GUI may graphically show the current position and thumbnails of the images acquired for user to see progress and status. The GUI may also provide fields to enter the various parameters described above. The GUI may also display a stitched composite image. However, in other embodiments, the composite image may be formed by a different system.

In some embodiments, the system 100 may be translated axially along the pipe 110. The system 100 may be rotated partially around to fully around the pipe 110 while translating. The at least partial rotation may result in a full inspection of the pipe section, critical area, or the like. In particular, a portion of the pipe 110 may be corroded, the translation and rotation may allow for coverage of such a portion. In particular, although a weld 122 has been used as an example, other structures of an object may be imaged.

In some embodiments, a relatively larger detector 102 or with translation of a relatively smaller detector 102, the images may be used to perform computed tomography. As a result, 3-dimensional information of welds 122 and corrosion including depth information of any identified flaws, or the like may be generated.

Figure 7:
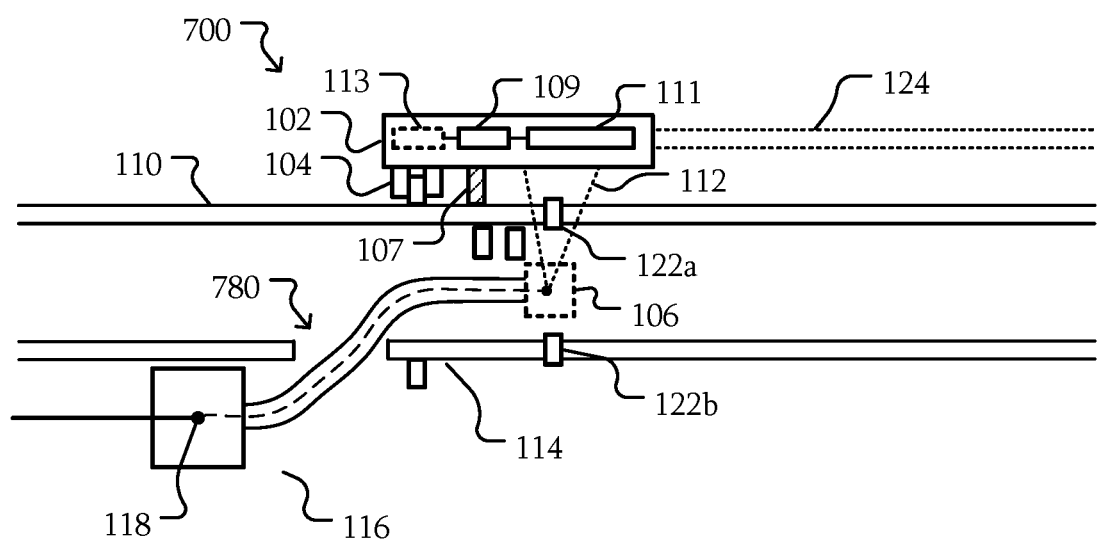
FIG. 7 is a block diagram of radiographic inspection system using radioisotopes according to some embodiments.

FIG. 7 is a block diagram of radiographic inspection system using radioisotopes according to some embodiments. The radiographic inspection system 700 may be similar to the radiographic inspection system 100 described above.

However, the radiographic inspection system 700 may not include a radiographic collimator 106 attached to the detector 102. In contrast, the radiographic collimator 106 may be a separate structure that is placed inside the pipe 110 such as through an access port 780, and end of the pipe, or the like. In some embodiments, the radioisotope is configured as a panoramic source. In other embodiments, a radiographic collimator 106 may be placed inside the pipe 110 and the radiation 112 may be collimated as described above. With the radiographic inspection system 700, a single wall single image (SWSI) may be formed. Similar to operations described above, the radioisotope 118 may be exposed and images may be created by rotating the detector 102 around the pipe 110. The radioisotope 118 may be exposed and retracted only once or less than once per image as described above. As a result, the operation may be performed more efficiently.

In some embodiments, the pipe 110 may be a schedule 40 pipe with diameters from about 1.5 in. to about 12 in. Such pipes 110 may have wall thicknesses ranging from about 0.145 in. to about 0.5 in. The actual outer diameters may range from about 1.9 in. to about 12.75 in.

In some embodiments, an integration time or dwell time for an image may be based on the type of pipe 110. For example, the table below lists examples of integration times per frame with a 1 curie source and a number of frames to average for a given diameter of schedule 40 pipe. These parameters may be based on a targeted gray count of about 30000.

| Schedule 40 | Wall Thickness (in.) | Outer Diameter (in.) | Integration time/frame/Curie | Number of frames to average |
|---|---|---|---|---|
| 3 | 0.216 | 3.5 | 0.0103 | 10 |
| 4 | 0.237 | 4.5 | 0.0152 | 10 |
| 6 | 0.28 | 6.625 | 0.0281 | 10 |
| 8 | 0.5 | 8.625 | 0.0419 | 10 |
| 10 | 0.5 | 10.75 | 0.0735 | 10 |
| 12 | 0.5 | 12.75 | 0.0850 | 10 |

In some embodiments, an enclosure of the detector 102 may be resistant to dust, water, heat, direct sunlight, or the like. The frame may be formed of aluminum. An extruded white plastic cover may minimize solar heating. Connectors such as push-pull connectors like LEMO® cable connections for power and data, flush with the enclosure body may protect cables from catching or snagging. An internal gasket may be used to resist liquid and dust intrusion.

The connection between the detector 102, support 104, collimator support arm 108, radioisotope collimator 106, exposure tube 114, or the like may have quick connect features to allow quick separation for easier handling, faster movement from one location to another, or the like. In addition, the collimator support arm 108 may also have such quick connect features so that the number of degrees of freedom and/or type of joints may be changed as desired in the field.

Figure 8:
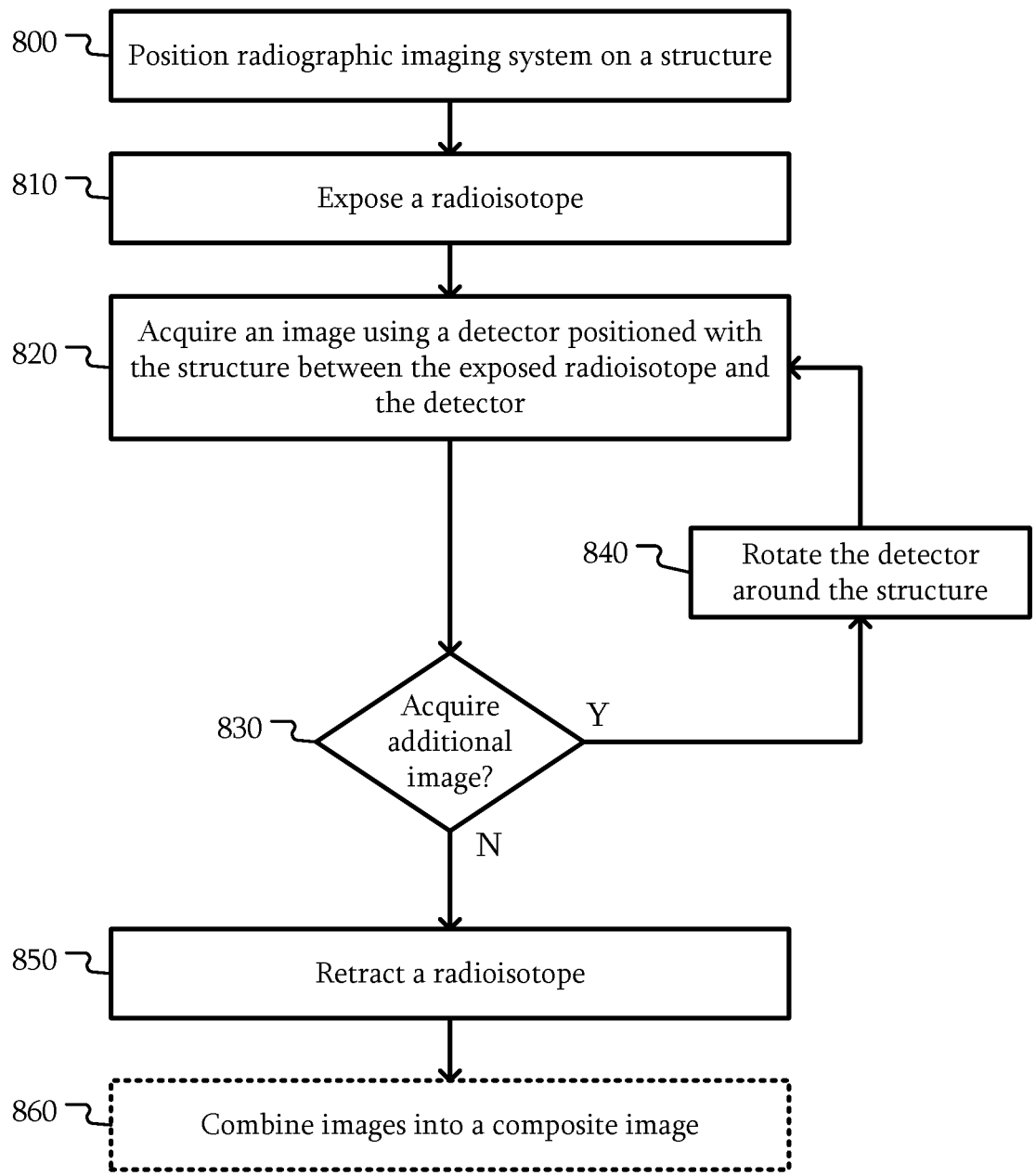
FIG. 8 is a flowchart of an operation of a radiographic inspection system according to some embodiments.

FIG. 8 is a flowchart of an operation of a radiographic inspection system according to some embodiments. Using the system 100 of FIGS. 1A and 1B as an example, in 800, the radiographic inspection system 100 is positioned on a structure. For example, the system 100 or the like described above may be placed on a structure such as a pipe 110 by securing a support 104 to the pipe 110. In some embodiments, the operation may be performed by a single person.

In 810, a radioisotope 118 is exposed. For example, the radioisotope 118 may be extended into the radioisotope collimator 106. In 820 an image is acquired using a detector 102 positioned with the structure between the exposed radioisotope 118 and the detector 102. The acquisition of an image may include the acquisition of multiple images that are averaged or otherwise combined into a single image.

In 830, if an additional image is to be acquired, the detector 102 is rotated around the structure in 840. If not, the radioisotope may be retracted in 850. Once the desired number of images have been acquired, the imaged may be combined into a composite image in 860.

Some embodiments include a radiographic inspection system 100, 100a, 100b, 600, 700, comprising: a detector 102; a support 104 configured to attach the detector 102 to a structure such that the detector 102 is movable around the structure; a radioisotope collimator 106; and a collimator support arm 108, 108a, 108b coupling the detector 102 to the radioisotope collimator 106 such that the radioisotope collimator 106 moves with the detector 102.

In some embodiments, the system 100, 100a, 100b, 600, 700 further comprises control logic 109 configured to rotate the detector 102 and the radioisotope collimator 106 around the structure.

In some embodiments, the control logic 109 is further configured continuously acquire data from the detector 102 as the detector 102 rotates.

In some embodiments, the control logic 109 is further configured to acquire a plurality of images from the detector 102, and each image is acquired at a different rotational position.

In some embodiments, the control logic 109 is further configured to combine the images into a composite image.

In some embodiments, the control logic 109 is further configured determine at least one of a dwell time and a number of the images.

In some embodiments, the system 100, 100a, 100b, 600, 700 further comprises a wireless communication system 100, 100a, 100b, 600, 700; wherein the control logic 109 is further configured to communicate data from the detector 102 through the wireless communication system 100, 100a, 100b, 600, 700.

In some embodiments, the control logic 109 is further configured to select an active area of the detector 102 less than an entire active area of the detector 102 for the acquisition of the images.

The system 100, 100a, 100b, 600, 700 of claim 2, wherein the control logic 109 is further configured to generate scanning parameters based on at least one of the structure and a radioisotope.

In some embodiments, the collimator support arm 108a comprises a c-arm.

In some embodiments, the collimator support arm 108, 108a, 108b is adjustable.

In some embodiments, the support arm 108, 108a, 108b comprises at least two degrees of freedom.

In some embodiments, the support 104 comprises a flexible belt configured to attach the detector 102 to the structure.

In some embodiments, the flexible belt is further move with the detector 102 as the detector 102 moves around the structure.

A method, comprising: exposing a radioisotope; acquiring a plurality of images using a detector 102 positioned with a structure between the exposed radioisotope and the detector 102; rotating the detector 102 around the structure between the acquisition of at least two of the images; retracting the radioisotope only after completing the acquiring of the images.

In some embodiments, the method further comprises rotating the radioisotope around the structure with the detector 102.

In some embodiments, rotating the detector 102 around the structure comprises rotating the detector 102 around the structure between the acquisitions of each sequential pair of the images.

In some embodiments, the method further comprises combining the images into a composite image.

In some embodiments, the method further comprises selecting a number of the images based on attributes of the structure.

Some embodiments include a system, comprising: means for generating images in response to radiation; means for collimating radiation; means for attaching the means for generating images in response to radiation to the means for collimating the radiation; and means for movably attaching the means for generating images in response to radiation to an object. Examples of the means for generating images in response to radiation include the detector 102, imaging array 111, and control logic 109. Examples of the means for collimating radiation include the radioisotope collimator 106. Examples of the means for attaching the means for generating images in response to radiation to the means for collimating the radiation include the collimator support arm 108, 108*a*, and 108*b*. Examples of the means for movably attaching the means for generating images in response to radiation to an object include the support 104.

In some embodiments, the system further comprises means for means for combining a plurality of images from the means for generating images in response to radiation into a composite image. Examples of the means for means for combining a plurality of images from the means for generating images in response to radiation into a composite image include the control logic 109 and the computer 190.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 ¶6. Embodiments of the invention in which an exclusive property or privilege is claimed are defined as follows.

The invention claimed is:

1. A radiographic inspection system, comprising:
    a detector;
    a support configured to attach the detector to a structure such that the detector is movable around the structure;
    a radioisotope collimator; and
    a collimator support arm coupling the detector to the radioisotope collimator such that the radioisotope collimator moves with the detector;
    wherein the collimator support arm is adjustable to change a position and/or rotation of the radioisotope collimator relative to the detector.

2. The system of claim 1, further comprising:
    control logic configured to rotate the detector and the radioisotope collimator around the structure.

3. The system of claim 1, wherein the collimator support arm comprises at least two degrees of freedom.

4. The system of claim 1, wherein the support comprises a flexible belt configured to attach the detector to the structure.

5. The system of claim 2, further comprising:
    a radioisotope disposed within the radioisotope collimator and configured to emit radiation towards the detector;
    wherein the control logic is further configured to continuously acquire data from the detector in response to the radiation as the detector rotates.

6. The system of claim 2, further comprising:
    a radioisotope disposed within the radioisotope collimator and configured to emit radiation towards the detector;
    wherein the control logic is further configured to acquire a plurality of images from the detector in response to the radiation, and each image is acquired at a different rotational position.

7. The system of claim 2, further comprising:
    a wireless communication system;
    wherein the control logic is further configured to communicate data from the detector through the wireless communication system.

8. The system of claim 2, further comprising:
    a radioisotope disposed within the radioisotope collimator and configured to emit radiation towards the detector;
    wherein the control logic is further configured to generate scanning parameters based on at least one of the structure and the radioisotope.

9. The system of claim 6, wherein the control logic is further configured to combine the plurality of images into a composite image.

10. The system of claim 6, wherein the control logic is further configured to determine at least one of a dwell time and a number of the plurality of images.

11. The system of claim 6, wherein the control logic is further configured to select an active area of the detector less than an entire active area of the detector for the acquisition of the plurality of images.

12. The system of claim 4, wherein the flexible belt is further configured to move with the detector as the detector moves around the structure.

13. A method, comprising:
exposing a radioisotope;
acquiring a plurality of images using a detector positioned with a structure between the exposed radioisotope and the detector;
rotating the detector around the structure between the acquisition of at least two of the plurality of images;
retracting the radioisotope only after completing the acquiring of the plurality of images.

14. The method of claim 13, further comprising rotating the radioisotope around the structure with the detector.

15. The method of claim 13, wherein rotating the detector around the structure comprises rotating the detector around the structure between the acquisitions of each sequential pair of the plurality of images.

16. The method of claim 13, further comprising combining the plurality of images into a composite image.

17. The method of claim 13, further comprising selecting a number of the plurality of images based on attributes of the structure.

18. A system, comprising:
means for generating radiation;
means for collimating the radiation;
means for generating images in response to the radiation;
means for attaching the means for generating images in response to the radiation to the means for collimating the radiation and for adjusting a position and/or rotation of the means for collimating the radiation relative to the means for generating images in response to the radiation; and
means for movably attaching the means for generating images in response to the radiation to an object.

19. The system of claim 18, comprising:
means for combining a plurality of images from the means for generating images in response to radiation into a composite image.

20. A radiographic inspection system, comprising:
a detector;
a support configured to attach the detector to a structure such that the detector is movable around the structure;
a radioisotope collimator;
a radioisotope disposed within the radioisotope collimator and configured to emit radiation towards the detector;
a collimator support arm coupling the detector to the radioisotope collimator such that the radioisotope collimator moves with the detector; and
control logic configured to rotate the detector and the radioisotope collimator around the structure;
wherein the control logic is further configured to generate scanning parameters based on at least one of the structure and the radioisotope.

* * * * *